United States Patent
Sibrell

(10) Patent No.: US 7,294,275 B1
(45) Date of Patent: Nov. 13, 2007

(54) METHOD OF REMOVING PHOSPHORUS FROM WASTEWATER

(75) Inventor: Philip L. Sibrell, Charles Town, WV (US)

(73) Assignee: The United States of America, as represented by the Secretary of the Interior, Washington, DC (US)

( * ) Notice: Subject to any disclaimer, the term of this patent is extended or adjusted under 35 U.S.C. 154(b) by 402 days.

(21) Appl. No.: 11/124,638

(22) Filed: May 4, 2005

(51) Int. Cl.
    *C02F 1/42* (2006.01)
(52) U.S. Cl. .................. 210/669; 210/688; 210/670; 210/906; 210/912
(58) Field of Classification Search ................ 210/906, 210/912, 609, 666, 667, 669, 688, 670
    See application file for complete search history.

(56) References Cited

U.S. PATENT DOCUMENTS

| 4,079,003 | A |   | 3/1978  | Manchak |
| 4,826,601 | A |   | 5/1989  | Spratt et al. |
| 4,948,510 | A |   | 8/1990  | Todd et al. |
| 5,093,007 | A |   | 3/1992  | Domvile |
| 5,248,422 | A |   | 9/1993  | Neu |
| 5,376,393 | A |   | 12/1994 | Nardelli et al. |
| 5,628,913 | A | * | 5/1997  | Modig ................ 210/770 |
| 6,030,537 | A |   | 2/2000  | Shaniuk et al. |
| 6,406,628 | B1 |  | 6/2002  | Chang et al. |
| 6,485,645 | B1 |  | 11/2002 | Husain et al. |
| 6,653,514 | B1 |  | 11/2003 | Murray et al. |
| 6,752,849 | B2 |  | 6/2004  | Logan et al. |
| 6,849,187 | B2 |  | 2/2005  | Shaniuk |
| 2002/0074292 | A1 | | 6/2002 | Schlegel et al. |
| 2004/0050795 | A1 | | 3/2004 | Park et al. |
| 2006/0243009 | A1 | * | 11/2006 | Burnham ................ 71/11 |

* cited by examiner

*Primary Examiner*—Chester T. Barry
(74) *Attorney, Agent, or Firm*—Mark Homer; Joan Gilsdorf

(57) ABSTRACT

A method of and system for removing phosphorus from wastewater using a waste sludge that has a high affinity for phosphorus. So the waste sludge can be used in a flow-through contact reactor to remove the phosphorus from a wastewater stream, the waste sludge is pelletized. The waste sludge pellets are packed into one or more flow-through contact reactors. In the configuration described herein, phosphorus removal is maximized by flowing the wastewater through the reactor(s) in a "pulsed" manner, rather than continuously. Thus, wastewater is flowed through the reactor(s) for a period of time and stopped for a period of time. By giving the sludge absorbent a rest period, the absorption capacity of the sludge is increased significantly, thus decreasing the frequency of regeneration or replacement of the sludge. Sludge regeneration can be accomplished with a stripping step using an alkaline solution of pH 13, followed by rinsing with water.

13 Claims, 9 Drawing Sheets

Figure 2. Phosphorus Adsorption Isotherms for AMD Sludge "A". Data plotted on linear scale in upper chart and on log scale in lower chart.
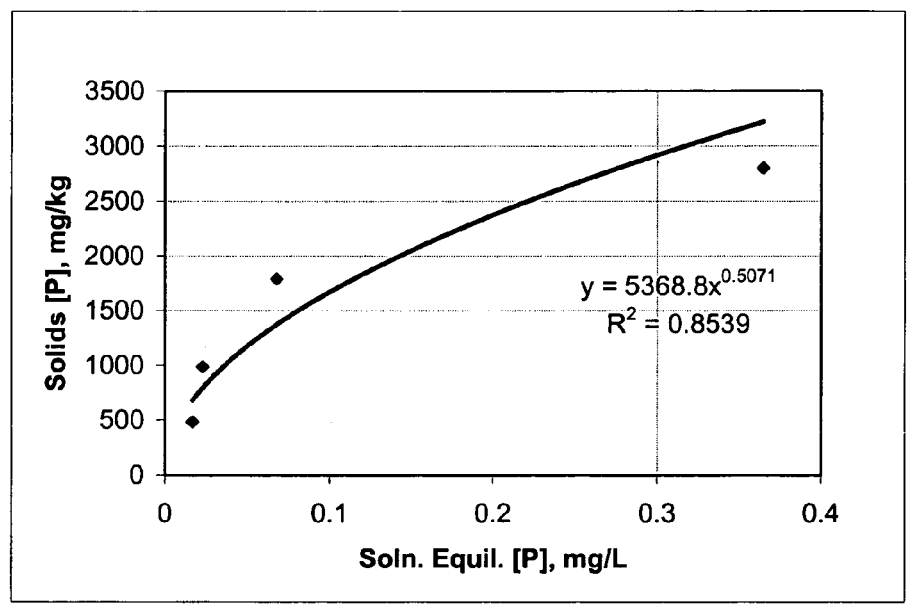
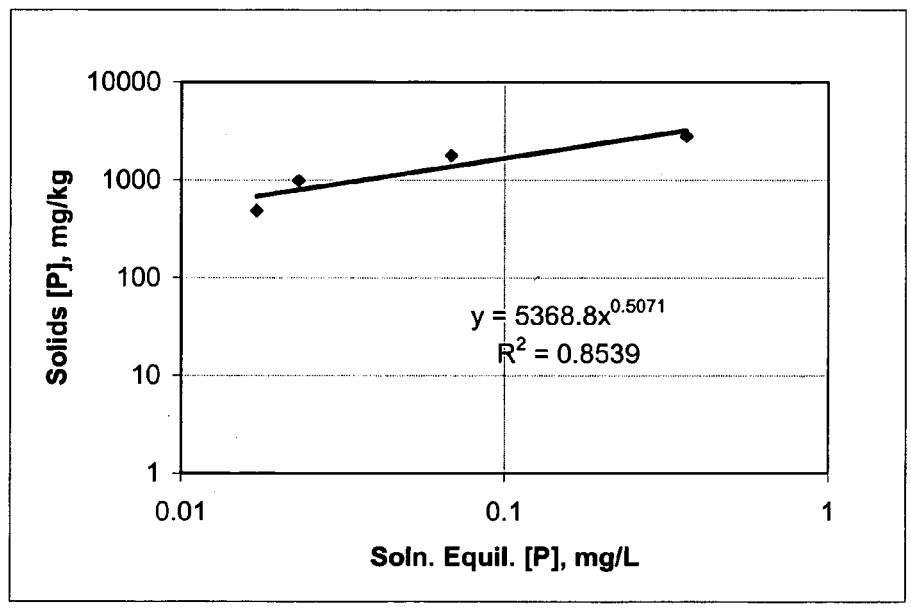

FIG. 3. AMD Pelletization Results

|  Size | Binder | Water Addition | Cure, days | +20 mesh, 5 min | +20 mesh, 10 min |
|---|---|---|---|---|---|
| Effect of cement addition | | | | | |
| -50 mesh | 30% cement | 110 | 3 | 94.6 | 92.3 |
| -50 mesh | 20% cement | 100.5 | 3 | 64.9 | 50.5 |
| -50 mesh | 10% cement | 106.2 | 3 | 34.1 | 19.7 |
| -100 mesh | 5% cement | 98.1 | 4 | <10% | NA |
| Other binders tested | | | | | |
| -100 mesh | 30% fly ash | 91.26 | 3 | <10% | NA |
| -50 mesh | 30% fly ash | 92.98 | 3 | <10% | NA |
| -20 mesh | 10% lime, CO2 | 114.5 | 7 | <10% | NA |
| Effect of feed material | | | | | |
| -20 mesh | 20% cement | 115.7 | 4 | 64.0 | 56.0 |
| -50 mesh | 20% cement | 105.7 | 3 | 74.6 | 67.1 |
| -50 mesh | 30% cement | 110 | 3 | 94.6 | 92.3 |
| -100 mesh | 30% cement | 100.1 | 3 | 88.5 | 85.8 |
| Effect of water addition | | | | | |
| -50 mesh | 30% cement | 91.8 | 3 | 72.8 | 69.1 |
| -50 mesh | 30% cement | 104.8 | 3 | 96.6 | 95.1 |
| -50 mesh | 30% cement | 110.1 | 3 | 95.3 | 93.3 |
| Effect of cure time | | | | | |
| -50 mesh | 30% cement | 105 | 1 | 95.5 | 93.4 |
| -50 mesh | 30% cement | 110 | 3 | 94.6 | 92.3 |
| -50 mesh | 30% cement | 110 | 5 | 93.5 | 91.1 |
| -50 mesh | 30% cement | 105 | 7 | 95.2 | 93.7 |

Figure 4. Phosphorus Adsorption Kinetics for AMD Sludges
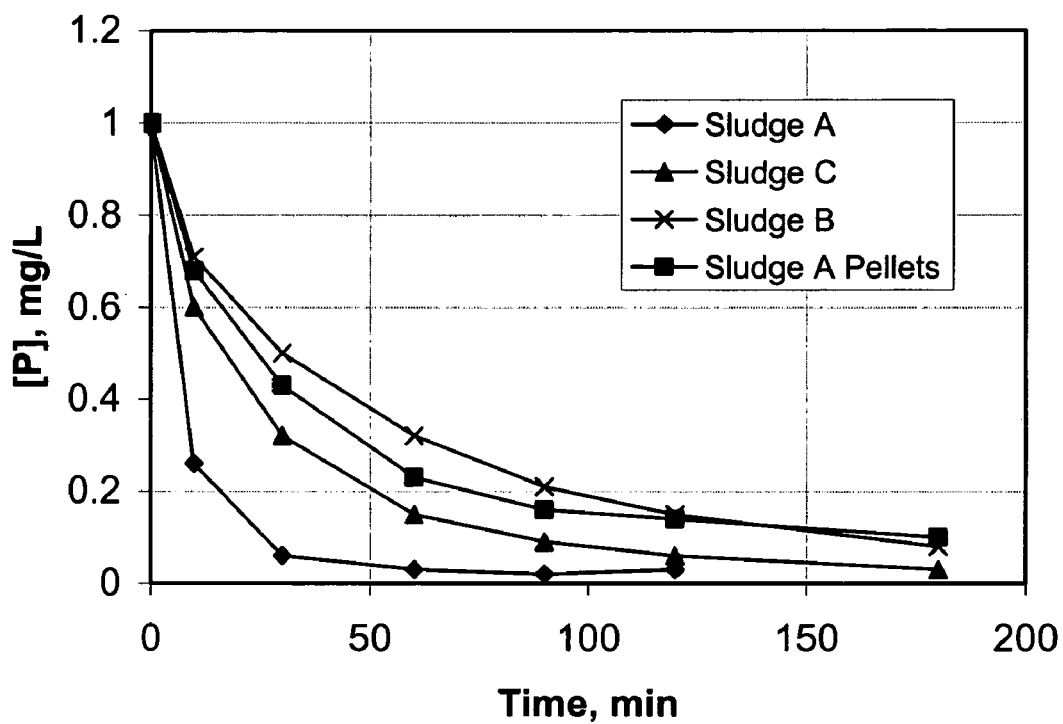

Figure 6. Phosphorus Pulsed Sorption - Pellets

Figure 8. Phosphorus Pulsed Sorption – Long Term Run
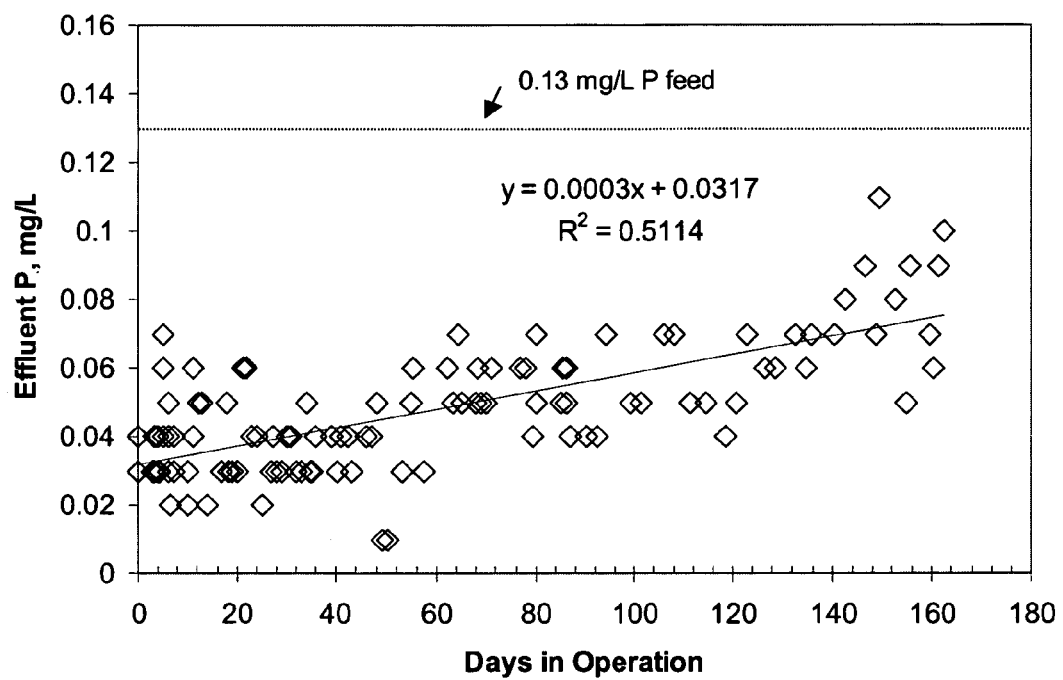

Figure 9. Column stripping results using 0.1 M NaOH. Phosphorus stripping efficiency was 76% of the amount loaded. Subsequent loading tests showed good performance, illustrating the utility of the stripping method.
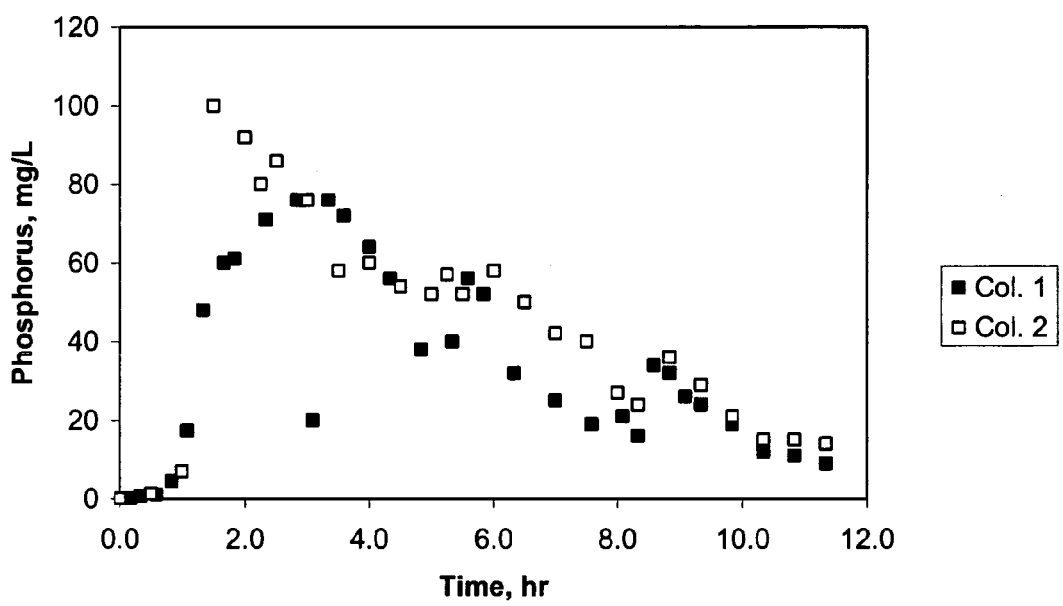

METHOD OF REMOVING PHOSPHORUS FROM WASTEWATER

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to removal of phosphorus or other elements from wastewater, more particularly to removal of phosphorus from wastewater using waste sludge, and most particularly to removal of phosphorus from wastewater using waste sludge in a flow-through contactor.

2. Description of the Related Art

Excess phosphorus in runoff and wastewaters from animal production facilities can result in eutrophication of watersheds with serious consequences for aquatic life and water quality. One of the largest remaining phosphorus sources is agriculture, through overuse of fertilizers and disposal of animal wastes. As an example, like any animal feeding operation, fish hatcheries generate significant amounts of phosphorus. The phosphorus released in the culturing of fish is distributed between solid and dissolved forms. Many hatcheries employ solid-liquid separation technologies to retain solid wastes, but at the present time, no economic options exist for removal of soluble phosphorus from hatchery wastewater. The soluble phosphorus is difficult to capture because of dilute concentrations in high flows of water. However, the cumulative phosphorus load of such operations is contributing to the nutrient loads of flowing waters, leading to degradation of stream water quality.

The problem of excessive soluble phosphorus loading of receiving waters is widespread in many parts of the country. For example, Pennsylvania currently operates thirteen fish hatcheries across the state to support a sport fishing industry that generates millions of dollars of income annually to the region. Recently, the state's Big Springs hatchery near Chambersburg, Pa. was closed because of degradation of the receiving stream through the release of solids and nutrients. As a result, the annual production of over 500,000 trout was lost. Estimated costs of renovation of the hatchery ranged from 2 to 17 million dollars. In addition, several of the state's hatcheries are located on the Susquehanna River or its tributaries. The Susquehanna is the largest river draining into the Chesapeake Bay, and currently contributes about 34% of the total phosphorous load to the bay. Under the Clean Water Act, the EPA has declared portions of the Chesapeake Bay to be impaired because of low dissolved oxygen concentrations resulting from excessive nutrient inputs. The recent Chesapeake 2000 agreement lists steps to be taken to reduce nutrients loads sufficiently so that the impaired designation can be removed. If this is not achieved, a mandatory cleanup will be implemented by the USEPA, requiring a Total Maximum Daily Load (TMDL) for the bay and its tributaries, with high costs of compliance. The steps to be taken include definitions of water quality conditions, followed by assignment of load reductions to each tributary entering the Chesapeake Bay. This will undoubtedly exert pressure on aquaculture facilities to decrease phosphorus emissions significantly. All of these factors are forcing hatchery operators to examine options to decrease phosphorus discharges to the environment. An economical method of prevention of phosphorus release would enable the hatchery system to continue to supply the fish required for the sport fishing industry, while at the same time restoring the hatchery receiving waters to the pristine aquatic environments they once were.

Phosphorus is typically removed from municipal and industrial wastes through the addition of aluminum or iron salts such as alum. These salts precipitate when mixed with neutral waters to form a heavy floc blanket that settles through the water column and removes phosphorus from solution. Phosphorus removal occurs by a combination of mechanisms, including adsorption by the aluminum or iron oxide floc (equations (1) or (2)), and direct precipitation of aluminum or iron phosphate (equations (3) or (4)).

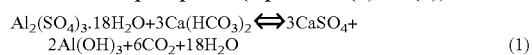

$$Al_2(SO_4)_3 \cdot 18H_2O + 3Ca(HCO_3)_2 \Longleftrightarrow 3CaSO_4 + 2Al(OH)_3 + 6CO_2 + 18H_2O \quad (1)$$

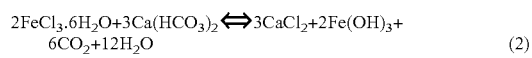

$$2FeCl_3 \cdot 6H_2O + 3Ca(HCO_3)_2 \Longleftrightarrow 3CaCl_2 + 2Fe(OH)_3 + 6CO_2 + 12H_2O \quad (2)$$

$$Al^{+3} + PO_4^{-3} \Longleftrightarrow AlPO_4 \quad (3)$$

$$Fe^{+3} + PO_4^{-3} \Longleftrightarrow FePO_4 \quad (4)$$

For complete removal of phosphorus, two to three times the stoichiometric requirement is usually needed. However, based on recently published costs for alum and iron salts, the cost of these chemicals generally prevents the use of this technology for the dilute high flows found in aquaculture wastes. Calcium compounds such as lime are sometimes used for phosphorus removal, as shown in equation (5), but require an elevated pH to achieve good phosphorus removal, which is not practical for large flows to be discharged into the environment.

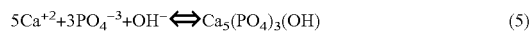

$$5Ca^{+2} + 3PO_4^{-3} + OH^- \Longleftrightarrow Ca_5(PO_4)_3(OH) \quad (5)$$

Reusable gel-based absorbents have been developed for aquaculture use, but also appear to be too expensive for use in large quantities.

Therefore, it is desired to provide a method for removing phosphorus from aquaculture wastewater streams that economical.

SUMMARY OF THE INVENTION

The invention proposed herein comprises a method of and system for removing phosphorus or other elements from wastewater streams, particularly from high volume wastewater streams having low concentrations of phosphorus, arsenic, selenium or other like elements, such as streams from animal feeding operations. The invention uses low-cost materials and can significantly reduce the overall phosphorus load provided by agricultural operations to open waters Accordingly, it is an object of this invention to provide a method of removing phosphorus or other elements from wastewater streams that is low-cost compared to current removal methods.

It is a further object of this invention to provide a method of removing phosphorus or other elements from wastewater streams that can be easily incorporated into high volume streams with low concentrations of phosphorus or other elements, such as fish hatcheries.

This invention meets these and other objectives related to removal of phosphorous or other elements from wastewater by providing a method of and system for removing phosphorus from wastewater using a waste sludge that has a high affinity for phosphorus or other selected elements. So the waste sludge can be used in a flow-through contact reactor to remove the phosphorus from a wastewater stream, the waste sludge is pelletized. The waste sludge pellets are packed into one or more flow-through contact reactors. In the configuration described herein, phosphorus adsorption capacity is maximized by flowing the wastewater through the reactor(s) in a "pulsed" manner, rather than continuously in one reactor. In order to treat water continuously, a pair of columns is required, with flow alternating between the columns, which are switched at regular intervals. The adsorption capacity of the sludge is increased tremendously by using these alternating flow and rest periods. Eventually, however, the sludge will become saturated with phosphorus and will no longer be able to remove more phosphorus from solution. At this point, the sludge would be either stripped and rinsed for reuse or replaced by a fresh batch. Stripping can be accomplished by contacting the sludge with an alkaline solution, preferably at pH of about 13, such as 0.1 molar solution of sodium hydroxide or some other strong base. The strip procedure is conducted at a lower rate of flow to increase the concentration of phosphorus in the strip solution and conserve chemical reagent.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 2 shows linear scale and log scale data for phosphorus adsorption isotherms for an example of acid mine drainage sludge.

FIG. 3 shows a table of AMD pelletization results

FIG. 4 shows phosphorus adsorption kinetics for different acid mine drainage sludges.

FIG. 8 shows removal of phosphorus over an extended period of time for an example of the present invention.

FIG. 9 shows stripping of phosphorus from saturated sludge pellets.

DESCRIPTION OF PREFERRED EMBODIMENTS

The invention, as embodied herein, comprises a method for removing phosphorus or other elements from wastewater streams that are high-flow, with a low concentration of phosphorus or other elements. The invention incorporates efficient flow-through contact reactors that are packed with pelletized waste sludge that has a high affinity for the element being removed. Wastewaters are flowed through the reactors in a "pulsed" fashion to maximize element removal. Due to the efficiency of the flow-through reactors and the low cost of the waste sludge raw materials, the method described herein can be economically used for high-flow waste streams that have low concentrations of phosphorus or other elements.

Figure 1:
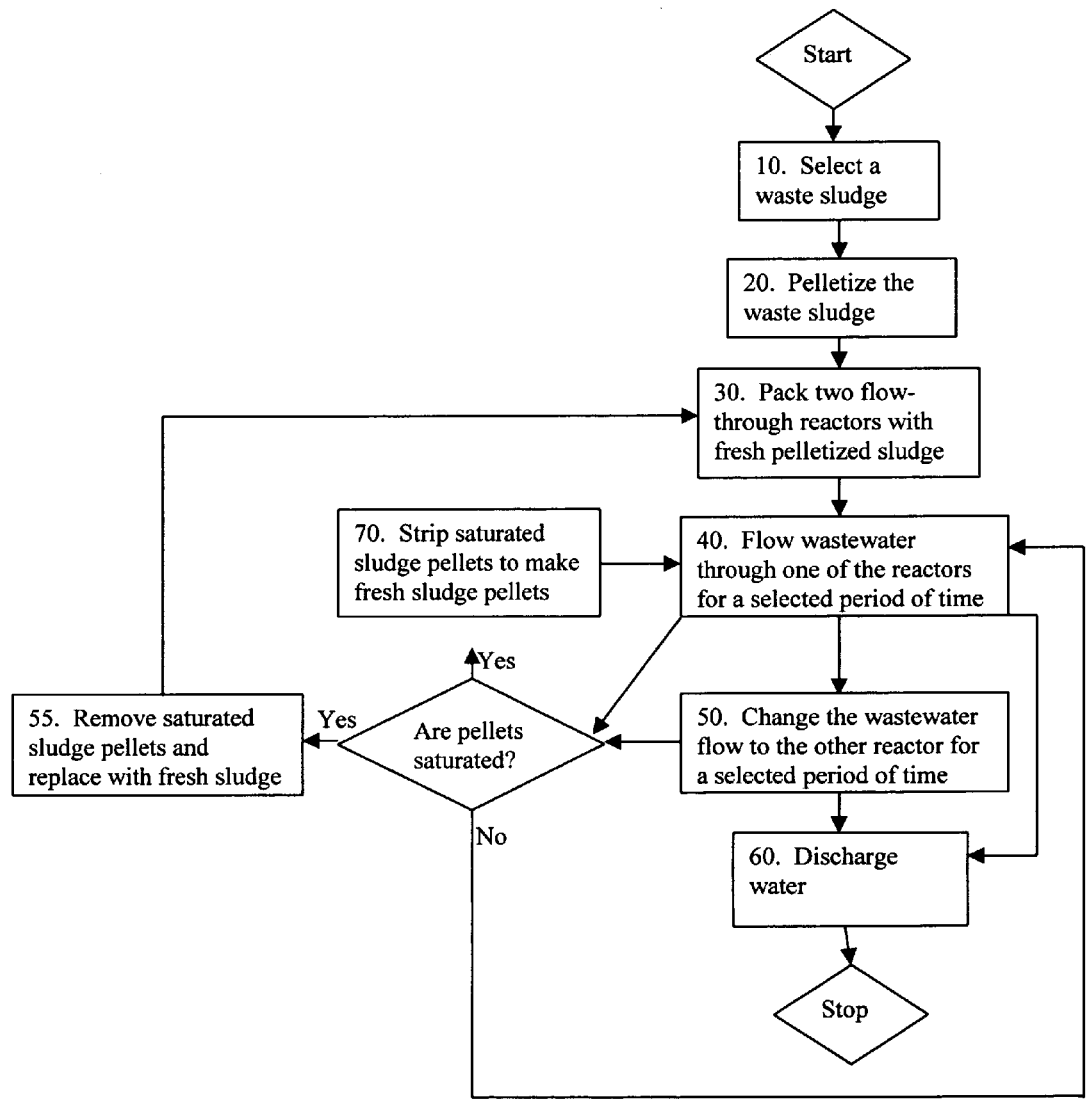
FIG. 1 is process flow diagram describing the present invention.

Referring to FIG. 1, step 1 is to select a waste sludge that has a high affinity for phosphorus 10 or other chemically similar elements such as arsenic or selenium. While, preferably, the invention described herein is employed for the removal of phosphorus, the invention can also be used to remove elements such as arsenic, selenium, or the like from wastewater. The removal of elements is dependent upon the waste sludge selected and the particular affinity said waste sludge has for these elements. While the description below focuses upon removal of phosphorus from wastewater, the invention may be employed, by selecting a waste sludge having an affinity for a particular element other than phosphorus, to remove such an element using the same principles described herein.

The waste sludge selected for use in the invention may be the result of many types of industrial processes, as long as the sludge contains components that have a high affinity for phosphorus and such sludge may be pelletized as further described below. Components that have a high affinity for phosphorus include the oxides/hydroxides of aluminum, iron, and calcium, and others known in the art. Industrial processes that produce waste containing such compounds include steelmaking slags, aluminum ore processing residues, coal combustion flyash and acid mine drainage (AMD) sludge from coal or metal mining operations. While wastes from these or other industrial processes that include Compounds with a high affinity for phosphorus may be employed in the present invention, due to accessibility, AMD sludge is preferred. As used herein, sludge having an affinity for a material means that the sludge attracts the material from the wastewater to bond with the sludge.

AMD is formed by the oxidation of sulfur in minerals (pyrite, $FeS_2$, is one of the most common) associated with coal and metal deposits to form sulfuric acid. The acid then solubilizes metals present in the host rock, usually including aluminum, iron and manganese. Although the initial oxidation of the pyrite by air is slow, AMD formation is catalyzed by bacterial action, through cycling of the $Fe^{2+}$ to $Fe^{3+}$, which then acts as an alternative oxidant for the dissolution of more pyrite (equation (9)).

$$FeS_2 + 7/2 O_2 + H_2O \Longleftrightarrow Fe^{2+} + 2SO_4^{2-} + 2H^+ \quad (6)$$

$$Fe^{2+} + 1/4 O_2 + H^+ \Longleftrightarrow Fe^{3+} + \tfrac{1}{2} H_2O \quad (7)$$

$$Fe^{3+} + 3H_2O \Longleftrightarrow Fe(OH)_3 + 3H^+ \quad (8)$$

$$FeS_2 + 14Fe^{3+} + 8H_2O \Longleftrightarrow 15Fe^{2+} + 2SO_4^{2-} + 16H^+ \quad (9)$$

Typical treatment for AMD flows is neutralization with alkaline materials, such as limestone, lime, caustic or ammonia. The neutralization of the acid results in precipitation of the iron and aluminum as a metal hydroxide sludge with high water content. Disposal of these waste sludges can represent a major operating cost of an AMD treatment facility. Development of alternate uses such as phosphorus sequestration for the waste sludge would decrease AMD treatment costs as well as prevent release of phosphorus into the environment.

Most AMD sludges containing aluminum and iron hydroxides have a strong affinity for phosphorus in water solutions. Testing of AMD sludge affinity for phosphorus was usually conducted with AMD sludge obtained from a test site in Pennsylvania, where the U.S. Geological Survey operated a 60-gallon per minute (gpm) limestone-based AMD neutralization pilot plant in 2000-2001. Some 450 tons of wet sludge were generated during processing. Tests were conducted using this sludge to determine phosphorus affinity and such AMD sludge is hereinafter referred to as Sludge "A". As recovered from settling tanks at the site, the sludge was very dilute, containing only about 10% solids by weight. A sample of dried sludge was analyzed by X-ray fluorescence for minerals content, and gave the results shown in Table 1 below.

TABLE 1

Bulk X-Ray Fluorescence analysis of Sludge "A". Composition reported in percent.

| Sample | $SiO_2$ | $Al_2O_3$ | $Fe_2O_3$ | MnO | MgO | CaO | $SO_3$ | LOI |
|---|---|---|---|---|---|---|---|---|
| AMID Sludge | 6.82 | 18.66 | 33.15 | 0.04 | 0.43 | 5.89 | 7.19 | 28.73 |

*LOI means loss on ignition and represents water vapor and other gases given off by the sample when heated.

A powdered sample of the sludge was used in preparation of an adsorption isotherm for the removal of phosphorus from water, shown in FIG. 2, linear scale. The removal of phosphorus from aqueous solution by the sludge is consistent with an adsorption process, as shown in FIG. 2, log scale, where the data has been fitted to a Freundlich adsorption isotherm as according to the following equation:

$$C_s = m * C_w^n \qquad (10)$$

Here $C_s$ is the concentration of solids adsorbed on the solid phase in mg/kg and $C_w$ is the concentration of phosphorus in the water in mg/L at equilibrium. For sludge "A", the slope n was determined to be 0.507 and the intercept m to be 5370 mg/kg. As the adsorption process is highly dependent on the surface area of the solid, a sample of dried AMD sludge was submitted for surface area determination using the Brunaur-Emmitt-Teller (BET) method, a widely used gas adsorption method. The results of this test gave the surface area of the AMD sludge to be 88.9 m²/g, indicating a high degree of porosity. This was not unexpected, given the nature of the sludge precipitation process. As the pH of an iron bearing solution is increased, the iron species hydrolyze, and then form a polymer-like linked structure. This explains the high water content of the sludge. As the sludge dries, the porous structure is preserved, as evidenced by the elevated surface area of the sludge. The concentration of the phosphorus adsorbed on the solids surface can be calculated based on the amount of phosphorus removed from solution and the weight of the solids. From the results in FIG. 2, the adsorbed phosphorus concentration ranged from 500 to nearly 3000 mg/kg of sludge. Higher aqueous solution concentrations support higher concentrations adsorbed on the solids. At a solution concentration of 0.1 mg P/L, the capacity of the solids for phosphorus is 1670 mg/kg. Therefore, for removal of 90% of the phosphorus from a wastewater influent containing 1 mg P/L, one kg of solids could treat 1860 L of solution before the solids reached saturation.

Different sources of AMD may be used in the present invention, those having iron and/or aluminum oxides are preferred. Other metal oxides/hydroxides may be present based on the geochemistry of the AMD source, such as manganese, copper and zinc. These materials may have much lower capacities for phosphorus removal, but still may be employed in the present invention under certain conditions. Several different neutralizing reagents are used in the treatment of AMD. Any of the commonly used reagents may be acceptable, as the aluminum and iron oxide removal mechanism is by pH adjustment and is not dependant on the neutralization agent used. However, certain combinations of AMD and neutralizing reagent may be found to be preferable for phosphorus removal from a given wastewater sample. Other iron- or aluminum-oxide-rich materials from industrial waste streams may also be used in the present invention. Examples of materials in this category would include water treatment residuals from alum- or ferric salt-based flocculation and settling systems, and iron oxide wastes (red muds) from the processing of aluminum ores.

Referring again to FIG. 1, step 2 requires pelletization of the selected waste sludge 20. The term pelletize, as used herein, merely means taking waste sludge material and transforming the sludge into particles of a solid material having a size appropriate for use in a flow-through contact reactor. This can be done using a "formal" pelletizing procedure as known in certain industrial processes or simplified procedures described below. While use of a waste sludge having a high affinity for phosphorus can remove phosphorus from wastewater under certain conditions, for the use of such material in treatment of wastewater to become practical from an economic and efficiency standpoint, the sludge must maintain its shape through handling and use in efficient removal systems.

The adsorption test described above was run using a powdered sample of AMD sludge for rapid approach to equilibrium. However, for contact in a flow-through apparatus (as discussed further below), the solids must be in a particulate form so as not to be swept out by the flow of water. When the AMD sludge dries, it generally forms solid chunks of material. These chunks can be broken up into the proper size range, generally between about 1 to about 4 mm in diameter for use in a packed or fluidized column. In some cases, if the chunks are hard enough to resist abrasion encountered in the handling of the sludge, the dried sludge may be immediately useful for phosphorus removal in a flow-through application, without further pelletization. However, in most cases, much of the solids will be either too soft or too coarse or fine for immediate use. The coarse material may be broken down by impact and attrition, generating suitable material for use in the column, but also generating fine material that is too small for use. The reject material can be returned to use, and made stronger, by the more formal pelletization process described below.

One example of a more formal pelletization process that may be employed in the present invention is as follows. Batches of pellets may be produced by tumbling in a rotating inclined drum while spraying with water. A weighed amount of binder is mixed in with the AMD sludge solids prior to pelletization. Water addition is measured by weighing the spray container before and after the pelletizing process. In addition, other pelletization processes may be employed including using continuous drums or disk pelletizers.

A typical procedure used by applicants follows. A given addition of a binder material (Portland cement) was added to 100 g of dried AMD sludge solids. The binder was blended with the dried solids on a rolling cloth, and additionally in the tumbling drum before water additions were begun. Water additions typically were on the order of 100 g, much higher than typical for non-porous materials such as iron ore fines. The resulting pellets were transferred to a stainless steel tray and placed in a plastic bag for curing for a certain number of days. Curing allows time for hydration and reaction of the compounds in the Portland cement with the AMD solids. Following the curing process, the solids were dried at room temperature for a given period of time before testing and evaluation. The strength and abrasion resistance of the pellets was tested by screening the pellets for five minutes in a Ro-Tap shaking apparatus, followed by weighing and determination of the fraction of pellets greater than 20 mesh in size. The process was then repeated once for a total of 10 minutes of shaking. Pellets with good abrasion resistance have a high percentage of material remaining on the screen after shaking. Results for several batches of solids are shown in FIG. 3.

These results indicate that a cement addition of 30% is preferred to produce pellets with the necessary strength and abrasion resistance for use with the invention described herein. Other binders tested include lime, which did not appear to be effective at the level added, and flyash.

The flyash-based pellets were much softer than equivalent cement-based pellets. However, the low cost of flyash as a cement substitute or supplement may warrant use of flyash or flyash-cement mixtures.

The effect of the particle size of the pellet feed material was also tested. Finer feed materials generally produced pellets with a better appearance, but abrasion resistance was adequate for those pellets made with a feed of minus 50 mesh. Coarser feed materials did not show good abrasion resistance. The moisture addition was also found to be important. With too little moisture, pellets did not gain necessary strength; however, with too much moisture the pellets became too large for use in column treatment. Cure times of one to seven days did not appear to have an effect on pellet abrasion resistance. Previous investigations with agglomeration of gold ores showed that a cure time of eight hours or greater was sufficient for curing. Therefore, it appears that the cure times may vary between a number of hours to a number of days, depending upon conditions The rate of phosphorus adsorption of several different batches of AMD sludge, including pellets made from sludge "A" were tested. To be employed in the present invention, the rate of adsorption must be rapid enough so the phosphorus can be removed from the aqueous solution in a reasonable contact time with the solid phase. In a packed or fluidized bed, this contact time might be as little as one minute or less. The kinetics of phosphorus adsorption were measured by contacting 1.5 g of AMD solids with 150 mL of water initially containing 1 mg/L P. The dried sludge and pellet samples were dry screened, and the size range from −5 and +10 mesh (USA) was selected for testing. To minimize attrition and increase in solid surface area, the solids were held in a stainless steel mesh ball while the solution was gently stirred using a magnetic stirrer. Samples were removed from solution at various time intervals and analyzed for the amount of P remaining in solution. Results for a variety of AMD sludge types and sizes is shown in FIG. 4. Of the AMD sludges tested, sludge "A" showed the most rapid removal of phosphorus from solution. Pelletization of the sludge decreased the adsorption rate somewhat, probably due to addition of the cement binder, which decreased porosity and diluted the active component of the adsorption process. However, phosphorus adsorption was still rapid enough for economic contact, especially given the lower phosphorus level in solution typically encountered in single pass aquaculture systems.

Referring again to FIG. 1, step 3 includes packing flow-through contact reactor(s) with the pelletized waste sludge 30. This step may be accomplished by simply pouring the pelletized waste sludge into the reactor or via a more formal method known by those skilled in the art. Many types of flow-through reactors are known in the art and may be employed in the present invention. One preferred example used in laboratory testing is a glass chromatography column.

Step 4 includes flowing the wastewater through the flow-through contact reactor(s) for a selected period of time 40. Step 5 includes alternating the flow between a pair of reactors so as to extend the amount of phosphorus that can be sorbed before the sludge becomes saturated with phosphorus. While any type of flow-through contact reactor known in the art may be employed in the present invention, preferably a glass chromatography column is used. The dimensions of the reactor are selected depending upon the flow rate of wastewater being treated and may be selected by one skilled in the art based upon the description herein. Also, either upflow or downflow of the wastewater may be employed through the reactor(s) of the present invention, with upflow being the preferred flow method.

The treatment flow rate at which the wastewater is passed through the reactor(s) may also be selected by one skilled in the art. The kinetics of the adsorption process determine that rate at which wastewater can be passed through the column. Treatment capacity, or the length of time that the system can be operated without regeneration or recharge of the absorbant increases if the wastewater is "pulsed" through the reactor(s). This relates to running the wastewater through a reactor for a period of time and stopping that flow for a period of time to allow the packing material to "rest". A pair of reactors would normally be used to maintain a constant rate of treatment. It is preferred that the "flow" period of time and the "rest" period of time be approximately equal. These times can be a few hours up to a few days, depending upon the size of the reactor, the amount of packing material, and the wastewater flow. It is preferred that the time periods be about twelve hours. While the sizes and times described in examples herein relate to relatively small reactor sizes and wastewater flow, it is to be understood that one of ordinary skill in the art can scale these sizes up or down based upon the cross sectional area of the column and the flow rate desired.

Referring again to FIG. 1, the next step is to remove saturated waste sludge pellets from the reactor and replace these pellets with fresh pellets. As used herein, waste sludge pellets are saturated when removal of phosphorus from wastewater falls below a percentage cutoff selected by a user of the system. One preferred cutoff is removal of 60% of the phosphorus from the wastewater. Fresh waste sludge pellets, as used herein, are waste sludge pellets are those that have not been used in the method described herein or have been stripped of phosphorus as described herein. Alternatively, the saturated pellets of waste sludge may be stripped of phosphorus and reused in the reactor(s). Stripping can be accomplished by contacting the sludge pellets with an alkaline solution, preferably at pH of about 13, such as 0.1 molar solution of sodium hydroxide or some other strong base. The strip procedure is conducted at a much lower rate of flow to increase the concentration of phosphorus in the strip solution and conserve chemical reagent.

While a single pair of reactors may be employed in the present invention, one may also use two or more pairs of reactors in a "train" in order to handle a greater volume of wastewater or to increase the efficiency or simplicity of the system. For example, a pair of reactors may be used wherein the flow of wastewater can be directed from one reactor to the other while the waste sludge pellets within the reactor not receiving flow can "rest" as described above. One may also employ several series of two reactors, in order to treat high volumes of wastewater. Use of a series of reactor pairs allows the absorbant to be used to full capacity, because of the reserve capacity contained in the second and any subsequent reactor pairs.

The below examples, along with the description herein, help to provide exemplary use of the invention. However, one skilled in the art may adjust amounts and materials to practice the invention under various conditions.

EXAMPLE 1

A sample of sludge "A" was packed in a glass chromatography column with an internal diameter of 1.5 cm and a height of 50 cm. Dried sludge particles from source "A" were screened to 5×10 mesh size and 36.7 g sludge was added to the column. Water was pumped through the column in a downward direction at a rate of 15 ml/min, using a Masterflex peristaltic pump. The water was a synthetic wastewater composed of spring water from the Leetown Science. Center to which $KH_2PO_4$ had been added to give a total phosphorus concentration of 1 mg/L. Performance of such columns is typically quantified by the time and volume of solution treated before a specified fraction of absorbate is detected in the column effluent. Scale up is done on the basis of the cross sectional area of the column, so results are typically expressed as time before breakthrough at a given flow rate in gallons per minute per square foot of column area. Under the conditions specified above, the area-based flow rate was 2.1 gallons per minute per square foot (gpm/ $ft^2$). A higher area flow rate translates into decreased equipment size and solids inventory for a given flow of wastewater. Results of the test are shown on in FIG. 5. The initial test was using sludge "A", and since the column was unattended during nighttime hours, the water flow was stopped at the end of each workday. Therefore, the flow was "pulsed" as described above. Removal of phosphorus was very good under the conditions tested, with a removal of over 80% of the incoming phosphorus, even after 80 hours of operation. A second column test, again using sludge A, was run with continuous flow. However, under these conditions, the phosphorus content of the water had risen to well above the pulsed column after only about 15 hours.

EXAMPLE 2

Figure 5:
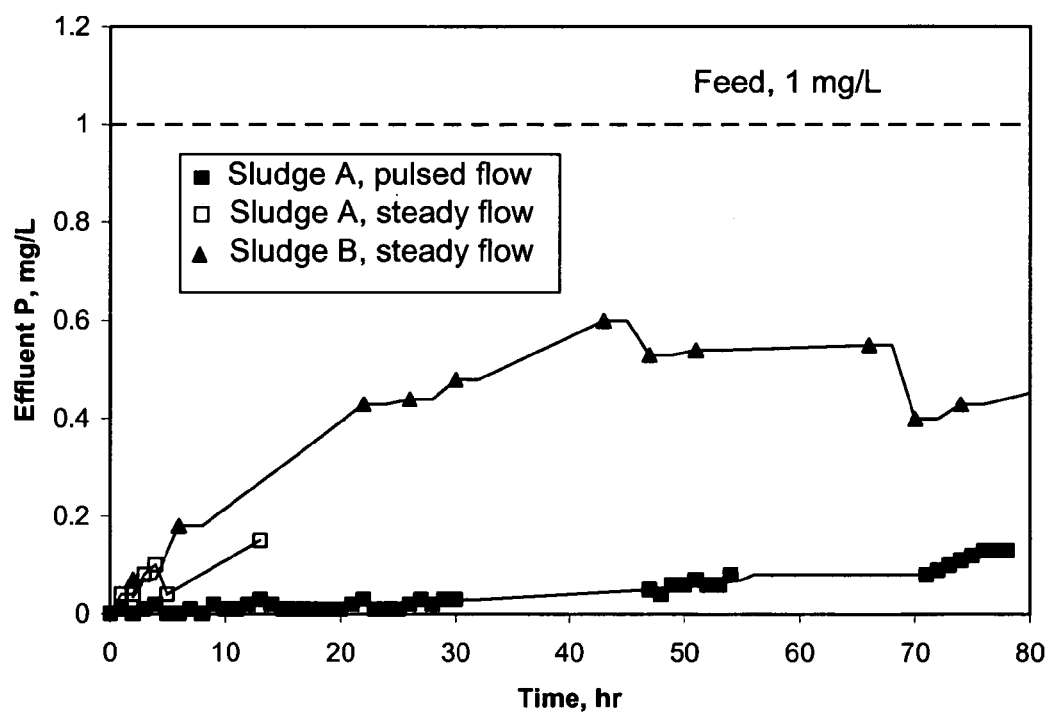
FIG. 5 shows the effect of pulsing wastewater flow versus continuous flow using the present invention.

A similar test was conducted using a second sludge sample (hereinafter, sludge "B"). The same equipment, configuration, and flow used in EXAMPLE 1 above were employed. However, rather than the "pulsed" flow used in EXAMPLE 1, the water was flowed continuously through the packed column. Results are also shown in FIG. 5. Phosphorus removal was much less effective than in EXAMPLE 1. Although this could be due to the effect of different sludge type, results from the kinetic test discussed earlier indicated that sludge "B" still has a good affinity for phosphorus, and indicated that "resting" of the column in the first test provided superior performance.

EXAMPLE 3

Figure 6:
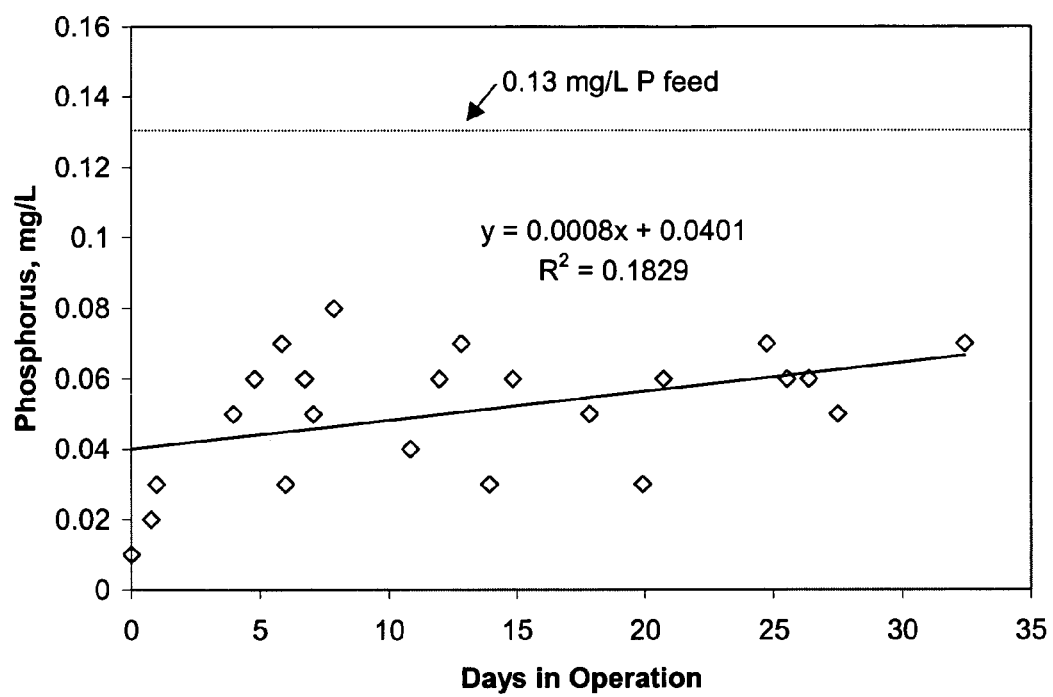
FIG. 6 shows removal of phosphorus over time for an example of the present invention.

AMD sludge pellets with a binder of 30% Portland cement were loaded into a pair of transparent plastic columns. Simulated wastewater was pumped through the column with a peristaltic pump. Flow was switched between columns on a 12-hour cycle. Results for this pelletized batch of AMD solids is shown in FIG. 6. Here, the columns treated a flow of 2.1 gpm/$ft^2$ for over 30 days with a phosphorus recovery of 60% of the incoming P, again, at a very low initial concentration.

EXAMPLE 4

This example is a theoretical example of removal of arsenic and/or selenium using the present invention. Treatment system configuration would be unchanged. However, the absorption capacity and kinetics for arsenic and selenium may be different from that observed for phosphorus. Many researchers have demonstrated that iron and aluminum oxides have high capacity for certain forms of arsenic and selenium. Rapid kinetics would result in a high treatment flow rate on an area basis, while slow kinetics would decrease the treatment flow rate. A high absorption capacity would increase the amount of time between recharge of the sludge, while a low capacity would mean that recharging would be required more often.

Figure 7:
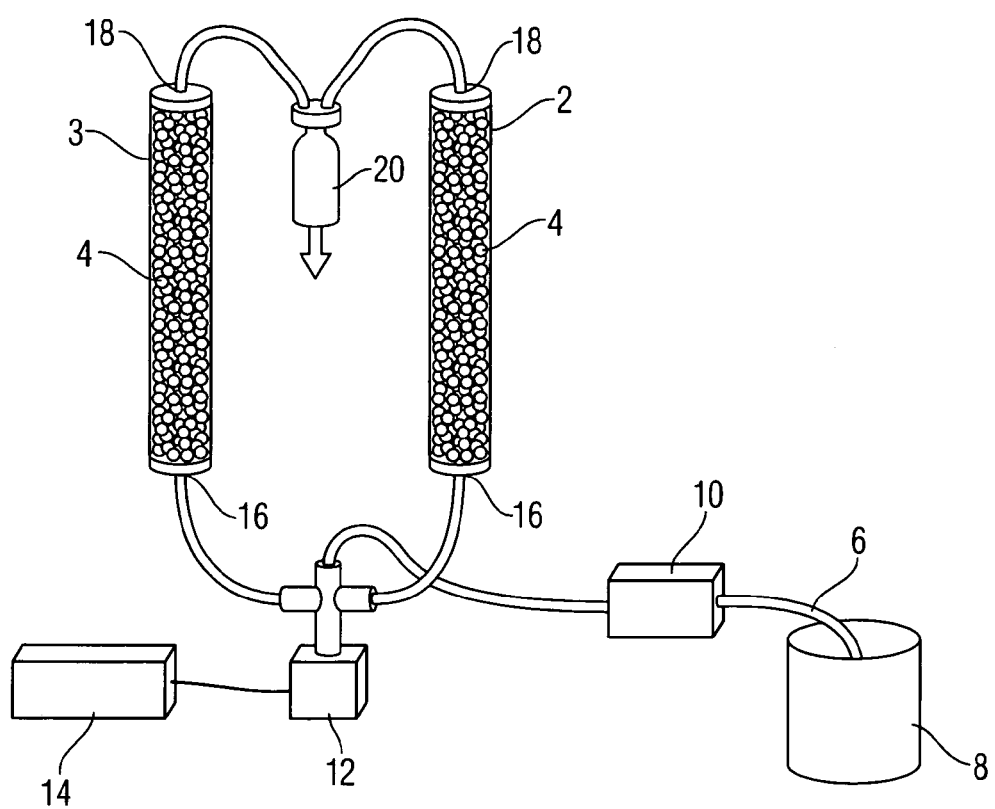
FIG. 7 is a view of an embodiment of the system of the present invention.

Based on the above results, the phosphorus removal system shown in FIG. 7 was designed. Two glass chromatography columns 2, 3 with an internal diameter of 2.5 cm and a height of 50 cm are set in series. The columns are both packed with 100 g of 10×20 mesh sludge "A" 4. A conduit 6 is placed between a wastewater reservoir 8 to a pump 10. The pump 10 pumps the wastewater through a three-way electronic actuated valve 12. The valve is controlled by timer controller 14. The valve 12 sends wastewater into the inlet 16 of either column 2 or 3. The wastewater exits the column 2 or 3 at outlet 18. The outlet 18 may be fed into a siphon break 20 which ensures that the exiting wastewater flows smoothly through the system.

In operation, the pump 10 pumps the wastewater to the valve means 12. The timer controller 14 opens the valve 12 to flow water into inlet 16 of column 3 for a period of time, preferably about 12 hours. At that point, the timer controller 14 changes the valve means 12 to allow wastewater to only flow into the inlet 16 of column 2. The wastewater is allowed to flow through column 2 for about the same period of time. This process is repeated until the sludge 4 capacity is reached, at which point, the sludge 4 will be either replaced by fresh sludge pellets or be regenerated by chemical treatment, preferably through stripping.

In a test of the system, the above described columns and packing material were used in an alternating sequence of twelve hours of flow followed by twelve hours of rest. Flow was switched between columns using an electrically actuated three-way valve controlled by a programmable timer. The apparatus was tested with 100 g of 10×20 mesh sludge "A" in each column treating a flow of 83 ml/min, for an area flow rate of 4.2 gpm/$ft^2$ (not including the resting column). To more closely simulate high-volume low-concentration wastewaters, the phosphorus concentration was decreased to 0.13 mg/L, again using $KH_2PO_4$ dissolved in spring water. Results of this test, shown in FIG. 8, indicate that even after 160 days of continuous operation, the apparatus had removed about 60% of the phosphorus in the incoming wastewater, even at this very low concentration of phosphorus, without any recharge or regeneration of the sludge pellets.

Stripping and regeneration of the sludge pellets was also demonstrated on this system. Following the 160-day loading test described above, a 0.1 M solution of sodium hydroxide was prepared, and passed through the columns at a rate of 21 ml/min over a four-day period for a total strip time of 11.3 hours for each column. Stripping was done during day shift only so that frequent sampling and analysis could be done to track the progress of the stripping procedure. FIG. 9 shows the phosphorus concentration in solution as a function of time for each of the columns used. Analysis of the strip solution showed concentrations of phosphorus as high as 100 mg/L, demonstrating the usefulness of the system in concentrating the phosphorus solution. Removal of the phosphorus adsorbed on the sludge was 76%, based on the analysis of wastewater and strip solutions over time. Following the stripping test, the sludge pellets were rinsed with spring water, then again used to treat wastewater under the same conditions as described for the system demonstration earlier. This absorption test was run for 6 hours and showed 90% removal of the phosphorus from the wastewater, indicating successful regeneration of the sludge pellets.

What is described are specific examples of many possible variations on the same invention and are not intended in a limiting sense. The claimed invention can be practiced using other variations not specifically described above.

What is claimed is:

1. A method of removing a material from wastewater, the material selected from phosphorus, arsenic, and selenium, comprising the steps of:
    pelletizing a waste sludge, the sludge having an affinity for the material;
    putting the pelletized waste sludge into at least one flow-through contact reactor;
    flowing the wastewater through the reactor;
    saturating the pelletized waste sludge with said material; and
    replacing the saturated pelletized waste sludge with fresh pelletized waste sludge.

2. The method of claim 1, further comprising the steps of:
    stopping the water flow for a second period of time after flowing the wastewater through the reactor for a first period of time; and,
    repeating the flowing and stopping steps.

3. The method of claim 2, wherein the material comprises phosphorus.

4. The method of claim 3, wherein the waste sludge comprises acid mine drainage sludge.

5. The method of claim 4, wherein the pelletizing step comprises drying the acid mine drainage sludge and dividing the dried sludge into particles comprising a diameter of about 1 millimeter to about 4 millimeters.

6. The method of claim 4, wherein the pelletizing step further comprises wetting the dried acid mine drainage sludge adding a binder to the acid mine drainage sludge.

7. The method of claim 6, wherein the first period of time and the second period of time comprise greater than 4 hours.

8. The method of claim 7, wherein the first period of time and the second period of time comprise about 12 hours.

9. A method of removing phosphorus from wastewater, comprising the steps of:
    pelletizing a waste sludge, the sludge having a phosphorus affinity;
    putting the pelletized sludge into a matched pair of flow-through contact reactors;
    flowing the water through the first flow-through reactor for period of time;
    stopping the water flow through the first flow-through reactor;
    flowing the water through the second flow-through reactor for the period of time;
    stopping the water flow through the second-flow through reactor; and,
    repeating the flowing and stopping steps, in the above order, until the pelletized waste sludge is saturated with said phosphorus; and,
    replacing the saturated pelletized waste sludge with fresh pelletized waste sludge.

10. The method of claim 9, wherein the waste sludge comprises acid mine drainage sludge.

11. The method of claim 10, wherein the period of time comprises about 12 hours.

12. The method of claim 11, further comprising third and fourth flow-through reactors wherein the first flowing step comprises flowing water through the first and third flow-through reactors and the second flowing step comprises flowing water through the second and fourth flow-through reactors.

13. The method of claim 9, wherein the replacing step comprises stripping the saturated pelletized waste sludge of phosphorus.

* * * * *